United States Patent
Kawamura (10) Patent No.: US 7,920,203 B2
(45) Date of Patent: Apr. 5, 2011

(54) IMAGE PICKUP APPARATUS AND METHOD OF CONTROLLING THE SAME

(75) Inventor: Masaru Kawamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 11/870,536

(22) Filed: Oct. 11, 2007

(65) Prior Publication Data

US 2008/0291293 A1    Nov. 27, 2008

(30) Foreign Application Priority Data

Dec. 1, 2006   (JP) ................. 2006-325668

(51) Int. Cl.
*H04N 5/232*    (2006.01)
*H04N 5/222*    (2006.01)
(52) U.S. Cl. ................... 348/362; 348/333.02
(58) Field of Classification Search ........... 348/362, 348/333.02
See application file for complete search history.

(56) References Cited

U.S. PATENT DOCUMENTS

| 6,262,817 B1* | 7/2001 | Sato et al. ............. 358/518 |
| 2005/0270397 A1* | 12/2005 | Battles ............. 348/333.01 |
| 2006/0008159 A1* | 1/2006 | Kobayashi ............. 382/232 |
| 2006/0274180 A1* | 12/2006 | Yasuda ............. 348/333.01 |

FOREIGN PATENT DOCUMENTS

JP    5-014803 A    1/1993

* cited by examiner

*Primary Examiner* — James M Hannett
(74) *Attorney, Agent, or Firm* — Canon U.S.A., Inc. I.P. Division (57) ABSTRACT

An image pickup apparatus is provided which has an exposure correction function and which determines a correction measure of exposure correction based on a parameter for determining an exposure amount, and performs the exposure correction by the determined correction measure so as to provide an image in a suitable exposure state intended by a person who shot the image.

19 Claims, 7 Drawing Sheets

| Av | F-NUMBER |
|---|---|
| 3 | 2.8 |
| 3 1/3 | 3.2 |
| 3 2/3 | 3.5 |
| 4 | 4 |
| 4 1/3 | 4.5 |
| 4 2/3 | 5 |
| 5 | 5.6 |
| 5 1/3 | 6.3 |
| 5 2/3 | 7.1 |
| 6 | 8 |
| 6 1/2 | 9.5 |
| 7 | 11 |

FIG. 4

| Tv | 1/T |
|---|---|
| ... | ... |
| 7 1/3 | 160 |
| 7 2/3 | 200 |
| 8 | 250 |
| 8 1/3 | 320 |
| 8 2/3 | 400 |
| 9 | 500 |
| 9 1/3 | 640 |
| 9 2/3 | 800 |
| 10 | 1000 |
| 10 1/2 | 1500 |
| 11 | 2000 |

IMAGE PICKUP APPARATUS AND METHOD OF CONTROLLING THE SAME

BACKGROUND OF THE INVENTION

1. Field of the Invention

The present invention relates to an image pickup apparatus and a method of controlling the same which allow exposure control modes including a manual exposure control mode to be selected.

2. Description of the Related Art

In an image pickup apparatus having an automatic exposure (hereinafter, referred to as AE) control function, an exposure amount during shooting is automatically determined by a built-in central processing unit (CPU) or the like.

Japanese Patent Laid-Open No. 5-014803 suggests an image pickup apparatus which allows a shooting mode, such as an aperture value (hereinafter, referred to as Av) priority mode and a shutter speed (hereinafter, referred to as Tv) priority mode, to be easily selected.

When an exposure control value determined through the AE control is corrected, or when a user sets a desired control value in the Av priority mode or the Tv priority mode, for example, a control value may be set by a measure of a ½ step or a ⅓ step.

Such a step number for setting the control value is a measure of the control. For example, when an F-number of 5.6 (also, hereinafter expressed like F5.6) is incremented by one step, the F-number may become F4. In a case where the control value is set by a measure of a ⅓ step, when F5.6 is incremented by a ⅓ step, the F-number may become F5.0.

The F-number is an aperture value obtained such that a focal length is divided by an effective opening diameter of the aperture. As the value becomes small, the brightness becomes enhanced.

However, in some cases, the exposure control value may not be corrected by the desired measure. The reasons are herein described below.

Av may be expressed as follows:

$$Av = 2 \log 2(f/D) \quad (1)$$

where D is an effective diameter of the aperture, and f is a focal length.

Also, the following expression is established:

$$Av + \Delta Av = 2 \log 2(f/(D + \Delta D)) \quad (2)$$

where $\Delta D$ is an error of an effective diameter of the aperture, and $\Delta Av$ is an error of Av.

Based on Expressions 1 and 2, $\Delta Av$ is expressed as follows:

$$\Delta Av = 2 \log 2 (1/(1 + \Delta D/D)) \quad (3)$$

As described above, since $\Delta Av$ which is the error of Av is determined in accordance with $\Delta D$, as $\Delta D$ becomes small, a driving amount of the aperture may cause an error more frequently.

In particular, when the aperture is controlled to an opening side, the error in driving amount of the aperture with respect to the opening diameter becomes relatively small. However, when the aperture is controlled to a closing side, the error in driving amount of the aperture with respect to the opening diameter may become relatively large.

Accordingly, based on Expression 3, the resolution of the aperture control becomes fine (results in high accuracy) as the aperture is controlled to the opening side (large), and the resolution becomes rough (results in low accuracy) as the aperture is controlled to the closing side (small).

Figure 5:
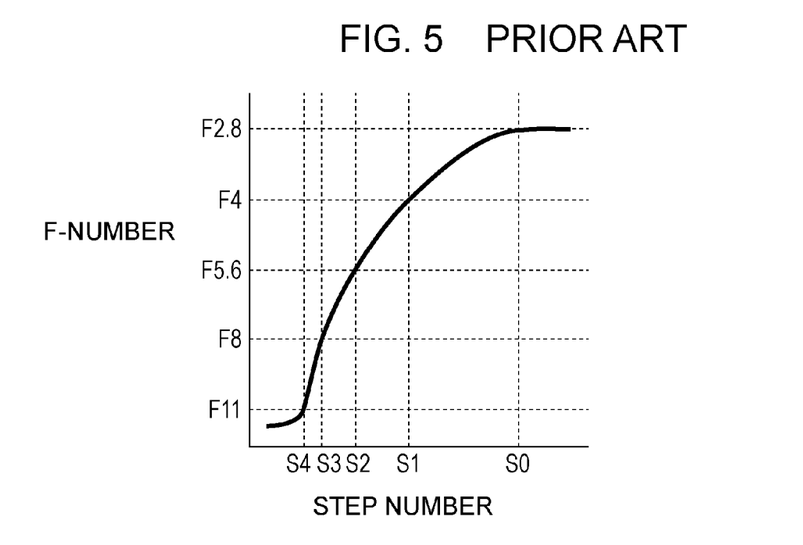
FIG. 5 is a graph showing characteristics of a step numbers and F-numbers in aperture control using a stepping motor.

FIG. 5 is a graph showing characteristics of step numbers and F-numbers in aperture control using a stepping motor. As shown in FIG. 5, the resolution is sufficient between a step S0 of F2.8 (opening side) and a step S of F4. In contrast, the resolution is insufficient between a step S3 of F8 and a step S4 of F11 (minimum aperture). The resolution is a minimum measure for the steps of a stepping motor so as to move the aperture by one step.

For example, in the case of the aperture control, if the minimum measure for the control step numbers corresponds to the resolution of the control at the closing side, then the control at the opening side with the high resolution may not be utilized.

On the other hand, if the minimum measure corresponds to the resolution at the opening side, then the control may be unstable at the closing side, thereby insufficiently providing the performance of a control device.

Similarly, Tv may be expressed as follows:

$$Tv = \log 2(1/T) \quad (4)$$

where T is an exposure time.

Also, the following expression is established:

$$Tv + \Delta Tv = \log 2(1/(T + \Delta T)) \quad (5)$$

where $\Delta T$ is an error of the shutter speed, and $\Delta Tv$ is an error of Tv. The error is caused by a delay from when a signal for moving a shutter is output until when the shutter is actually moved, the delay depending on an individual difference.

Based on Expressions 4 and 5, $\Delta Tv$ is expressed as follows:

$$\Delta Tv = \log 2(1/(1 + \Delta T/T)) \quad (6)$$

As described above, since $\Delta Tv$ which is the error of Tv is determined in accordance with $\Delta T$, as $\Delta T$ becomes small, the Tv control may cause an error more frequently.

In particular, in Tv control at a low speed, the error of the Tv control with respect to the exposure time becomes relatively small. In contrast, in the Tv control at a high speed, the error of the Tv control with respect to the exposure time becomes relatively large.

Accordingly, the resolution of the Tv control becomes rough (results in low accuracy) as the speed increases, and becomes fine (results in high accuracy) as the speed decreases.

As described above, in the case of the Tv control, if the minimum measure for the control step numbers corresponds to the resolution of the Tv control at the high speed, then the Tv control the low speed with the high resolution may not be utilized. On the other hand, if the minimum measure for the control step numbers corresponds to the resolution of the Tv control at the low speed, then the Tv control may be unstable at the high speed, thereby insufficiently providing the performance of the control device. When the user performs the exposure correction on the result provided by the camera through the AE, the exposure correction is made by a predetermined measure such as a ½ step or a ⅓ step.

In addition to the above configuration, a histogram function is provided that displays a luminance distribution of an object.

The user may use the histogram function so as to recognize the luminance distribution of the object, and perform the exposure correction while viewing the distribution.

The exposure correction has been based on the measure of a ½ step or a ⅓ step for instance; however, since the exposure control is becoming highly accurate, the correction measure such as a ½ step or a ⅓ step may be insufficient to provide fine exposure control as intended by the user. Meanwhile, the user may process an shot image to obtain a desired luminance through, e.g., image processing using a computer.

Figure 12:
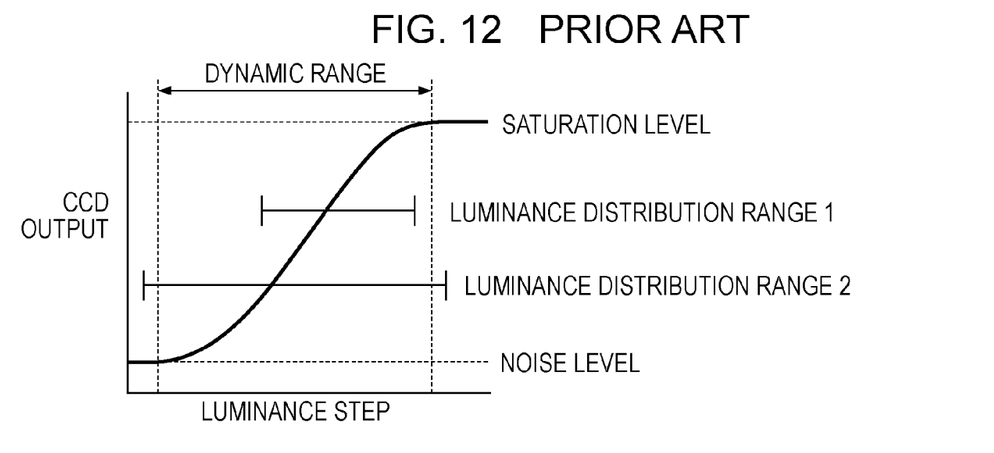
FIG. 12 is a graph showing a relationship between an output of the image pickup device and a luminance distribution of an object.

FIG. 12 is a graph showing a relationship between an output of the image pickup device and a luminance distribution of an object. In FIG. 12, when the luminance of the object is within "a luminance distribution range 1", the luminance is within a dynamic range of the image pickup device. In this state, even though the exposure is corrected with a relatively discrete measure such as a ½ step or a ⅓ step, the processing of the luminance using a computer or the like after the image is shot may provide an image in a suitable exposure state that is intended by a person who shot the image but without underexposure or overexposure.

When the luminance of the object is within "a luminance distribution range 2", the luminance exceeds the dynamic range of the image pickup device. In order to obtain an image in the suitable exposure state, it is important to perform fine exposure correction to adjust the luminance distribution within the dynamic range.

However, if the exposure is corrected with the relatively discrete measure such as a ½ step or a ⅓ step, a correction amount becomes too large, and therefore, an image in the suitable exposure state that is intended by a person who shot the image may not be provided.

SUMMARY OF THE INVENTION

The present invention has been made in consideration of the above situation, and provides an image pickup apparatus that performs highly accurate exposure control by changing a measure for control step numbers of the exposure correction, the control step numbers being previously set in the image pickup apparatus.

According to an aspect of the present invention, an image pickup apparatus is provided which includes an image pickup section configured to photo-electrically convert incident light being focused on an imaging surface, a parameter setting section configured to set a parameter to determine an exposure amount of the image pickup section, a correction measure determining section configured to determine a correction measure of exposure correction based on the parameter set by the parameter setting section, and an exposure correcting section configured to perform the exposure correction by the correction measure determined by the correction measure determining section.

Other embodiments, features and aspects of the present invention will be apparent from the following description taken in conjunction with the accompanying drawings, in which like reference characters designate the same or similar parts throughout the Figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Various embodiments, features and aspects of the present invention will now herein be described in detail in accordance with the accompanying drawings.

First Exemplary Embodiment

Figure 1:
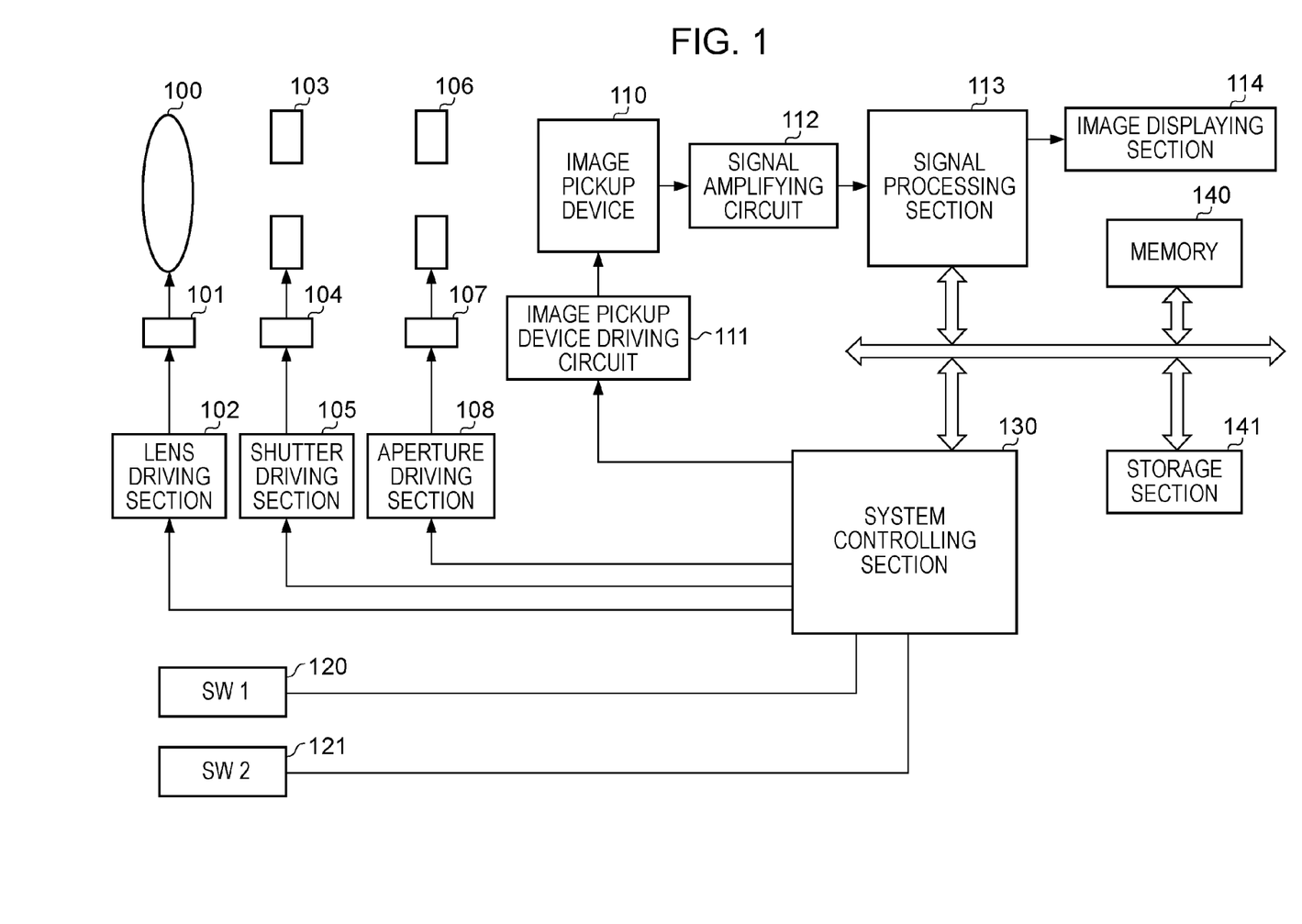
FIG. 1 is a block diagram showing an example image pickup apparatus according to a first exemplary embodiment of the present invention.

FIG. 1 is a block diagram showing an example image pickup apparatus according to an embodiment of the present invention. Illustrated in FIG. 1 is a lens 100, a lens controlling motor 101 that drives the lens 100, a lens driving section 102 that controls the driving of the lens 100 through the lens controlling motor 101, a shutter 103, a shutter controlling motor 104 that drives the shutter 103, a shutter driving section 105 that controls the driving of the shutter 103 through the shutter controlling motor 104, an aperture 106, an aperture controlling motor 107 that drives the aperture 106, and an aperture driving section 108 that controls the driving of the aperture 106 through the aperture controlling motor 107.

An image pickup device 110 photo-electrically converts incident light. An image pickup device driving circuit 111 drives the image pickup device 110 in various driving modes including a still image shooting mode, a movie recording mode, and a movie displaying mode using, for example, an electric view finder. In some cases, the movie recording mode may be substantially the same as the movie displaying mode depending on the type of image pickup device and the method of signal processing. A signal amplifying circuit 112 amplifies a gain of a signal output from the image pickup device 110. A signal processing section 113 processes the signal output from the signal amplifying circuit 112, the processing including A/D conversion, predetermined pixel interpolation, and color conversion. An image displaying section 114 displays an image signal processed by the signal processing section 113. For example, the image displaying section 114 may be a liquid crystal display. A system controlling section 130 controls devices disposed in the image pickup apparatus. A release button may provide two-step press, and is composed of a SW1 120 which is turned ON by half press, and a SW2 121 which is turned ON by full press. A memory 140 temporarily stores various data, a movie, and a still image after image processing. The memory 140 may also store data used by the system controlling section 130. A storage section 141 is, for instance, hard disk or a memory card. The storage section 141 may be detachably mounted, may be built in a main body, or may be a configuration, such as a communication card, for transmitting data to an external recording medium.

Also, a memory (not shown) built in the signal processing section 113 and a memory (not shown) built in the system controlling section 130 may be used depending on the amount of data of image signals, and the type of recording medium. Alternatively, the speed of the signal processing may be adjusted, and then, data may be output directly to a recording medium or an image displaying apparatus without being transmitted to the memory.

In the above-described configuration, an optical signal which has passed the lens 100 is photo-electrically converted by the image pickup device 110, passed through the signal amplifying circuit 112, and input to the signal processing section 113.

The signal processing section 113 outputs an image signal to the image displaying section 114, and also extracts data from the image signal, the data including a luminance signal, a color signal, and a sharpness. The extracted data is used for performing AE control, white balance (hereinafter, referred to as WB) control, and auto focus (hereinafter, referred to as AF) control.

For the control of the aperture 106, the system controlling section 130 controls the aperture driving section 108 to drive the aperture controlling motor 107 in accordance with Av. Thus, the opening and closing of the aperture 106 is controlled. For the control of the shutter 103, the system controlling section 130 controls the shutter driving section 105 to drive the shutter controlling motor 104 in accordance with Tv. Thus, the shutter 103 is controlled. For the control of the gain of the signal amplifying circuit 112, the system controlling section 130 controls the signal amplifying circuit 112 to amplify the output signal of the image pickup device 110 in accordance with the gain value.

For the AF control, a known method is applied. For the AE control, a luminance level signal is extracted from a signal input to the signal processing section 113, and the aperture 106, the shutter 103, and the gain are controlled such that the luminance level signal becomes a predetermined value.

When the SW2 121 is pressed and the exposure control is started, the system controlling section 130 controls the devices to pick up an image in accordance with the previously set Av and Tv.

The signal processing section 113 applies various processing to the image pickup signal, and the storage section 141 stores the signal. In a case where the aperture 106 can be controlled by a ⅓ step in a range from F2.8 to F8 and by a ½ step in a range from F8 to F11, combinations of Avs and F-numbers which may be set in the Av priority mode shown in a table of FIG. 3 are provided.

In this embodiment, the aperture controlling motor 107 can be finely moved; however, the aperture 106 is difficult to follow the movement of the aperture controlling motor 107. So, the control is available by a measure for step numbers that can provide a certain degree of accuracy. This may be also applied to the control of the shutter (described below).

Figure 4:
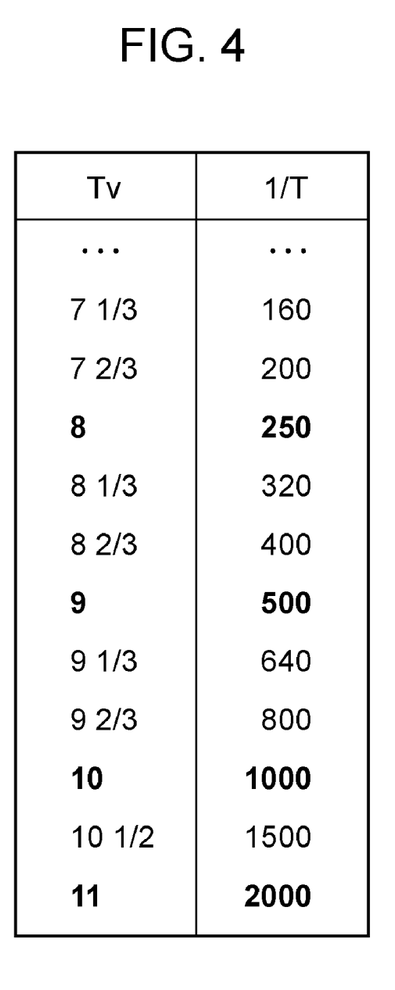
FIG. 4 is a table showing combinations of Tvs (shutter speeds) and values of 1/T which may be set in a Tv priority mode according to the embodiment of the present invention.

In a case where the shutter 103 can be controlled by a ⅓ step in a range where T is slower than ¹⁄₁₀₀₀ second, and by a ½ step in a high-speed range where T is faster than ¹⁄₁₀₀₀ second, combinations of Tvs and values of 1/T which may be set in the Tv priority mode shown in a table of FIG. 4 are provided. In FIG. 4, a low-speed range is not illustrated for convenience of description.

Figure 3:
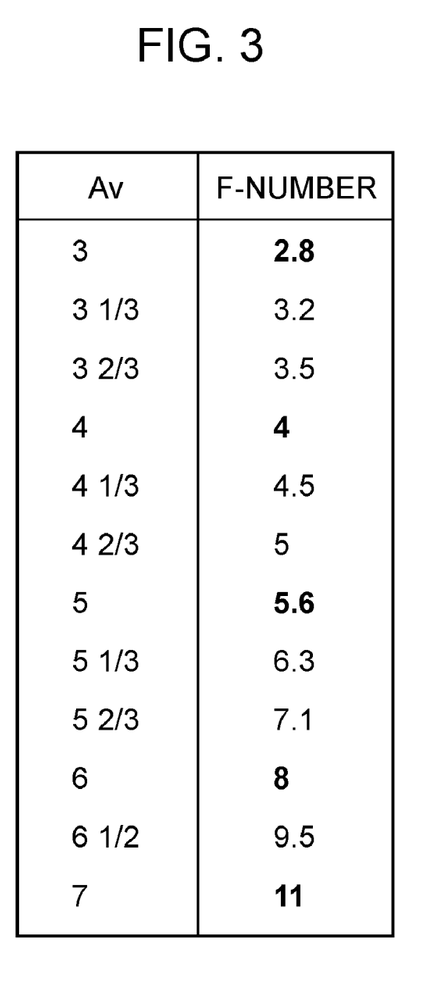
FIG. 3 is a table showing combinations of Avs (aperture values) and F-numbers which may be set in an Av priority mode according to the embodiment of the present invention.

The combinations of values in the tables of FIGS. 3 and 4 are stored in a memory (not shown) built in the signal processing section 113 or a memory (not shown) built in the CPU.

Figure 2:
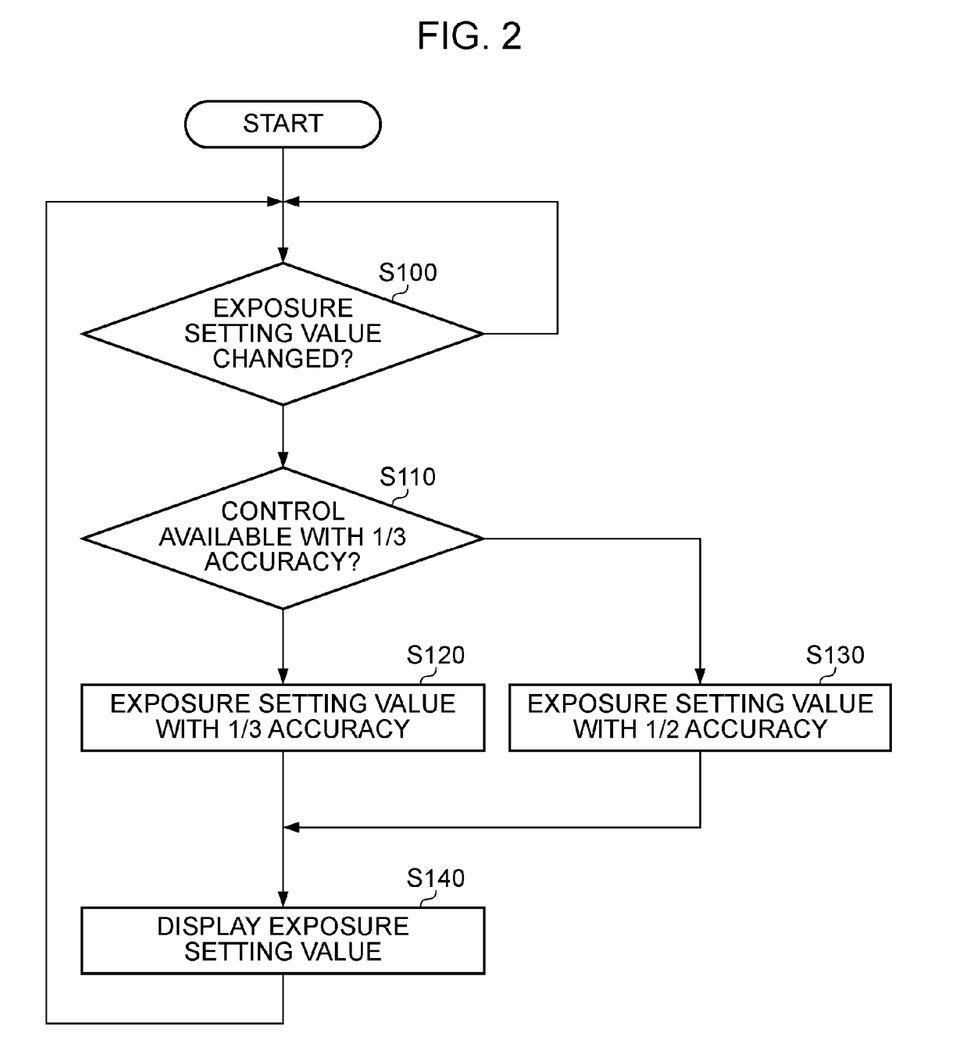
FIG. 2 is a flowchart showing an example procedure for exposure correction value setting according to the embodiment of the present invention.

FIG. 2 is a flowchart showing an example procedure for exposure correction value setting according to the embodiment of the present invention. When the Tv priority mode is selected, a user operates a member like a dial, and sets a desired value of Tv by an operation amount of the member.

In Step S100, the system controlling section 130 determines whether the exposure correction is input or now. When the system controlling section 130 determines that the exposure correction is not input in Step S100, the operation of Step S100 is repeated until the determination is changed.

When the system controlling section 130 determines that the exposure correction is input in Step S100, the operation proceeds to Step S110. In Step S110, the system controlling section 130 determines the measure for the step numbers corresponding to the control with Tv currently set by the image pickup apparatus, on the basis of the numerical data shown in FIG. 4 which is stored in the memory (not shown).

When the system controlling section 130 determines that the measure for the step numbers corresponding to the control is a ⅓ step in Step S110, the operation proceeds to Step S120. Then, the system controlling section 130 corrects the exposure by a ⅓ step, and the operation proceeds to Step S140.

When the system controlling section 130 determines that the measure for the step numbers corresponding to the control is a ½ step in Step S110, the operation proceeds to Step S130. Then, the system controlling section 130 corrects the exposure by a ½ step, and the operation proceeds to Step S140. In Step S140, the image displaying section 114 displays the previously set exposure correction value.

Also in the Av priority mode, similar control may be performed. In the Av priority mode, the measure for the step numbers corresponding to the control is determined on the basis of the numerical data shown in FIG. 3 which is stored in the memory (not shown).

Figure 6:
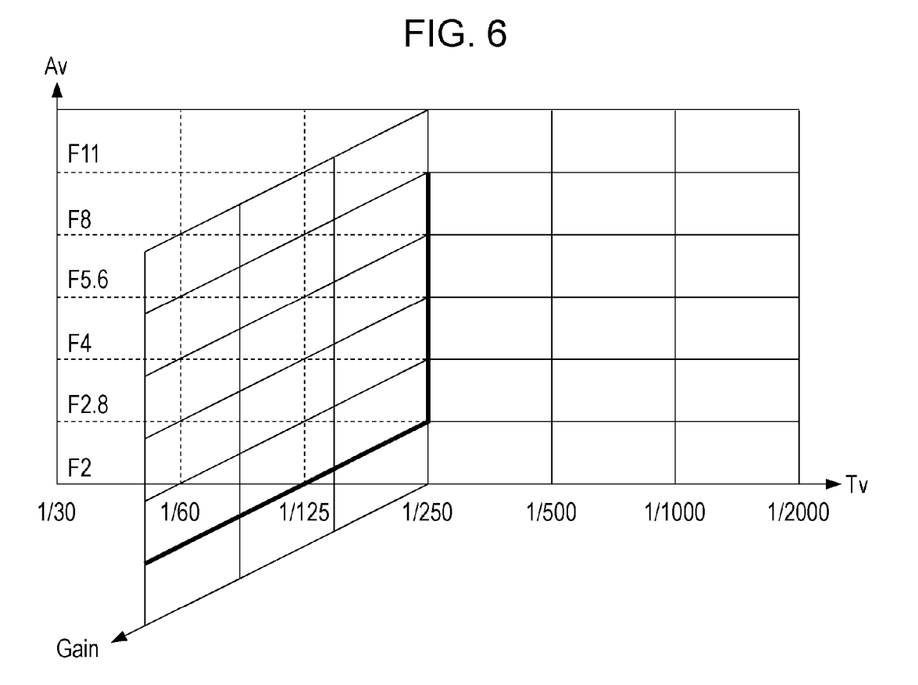
FIG. 6 is a program diagram showing a relationship among Av, Tv and a gain value in the Tv priority mode and in a case where Tv is set to 1/250 second according to the embodiment of the present invention.

Next, the details of an example exposure correction are described. FIG. 6 is a program diagram showing a relationship among Av, Tv and a gain value in the Tv priority mode and in a case where Tv is set to ¹⁄₂₅₀ second. Even if the image pickup apparatus does not have a program diagram, the exposure may be determined exclusively as long as Tv is set. Therefore, the exposure may be actually controlled on the basis of the program diagram. The step numbers corresponding to the aperture control may be similar to the numerical data shown in FIG. 3 which is stored in the memory (not shown).

Figure 7:
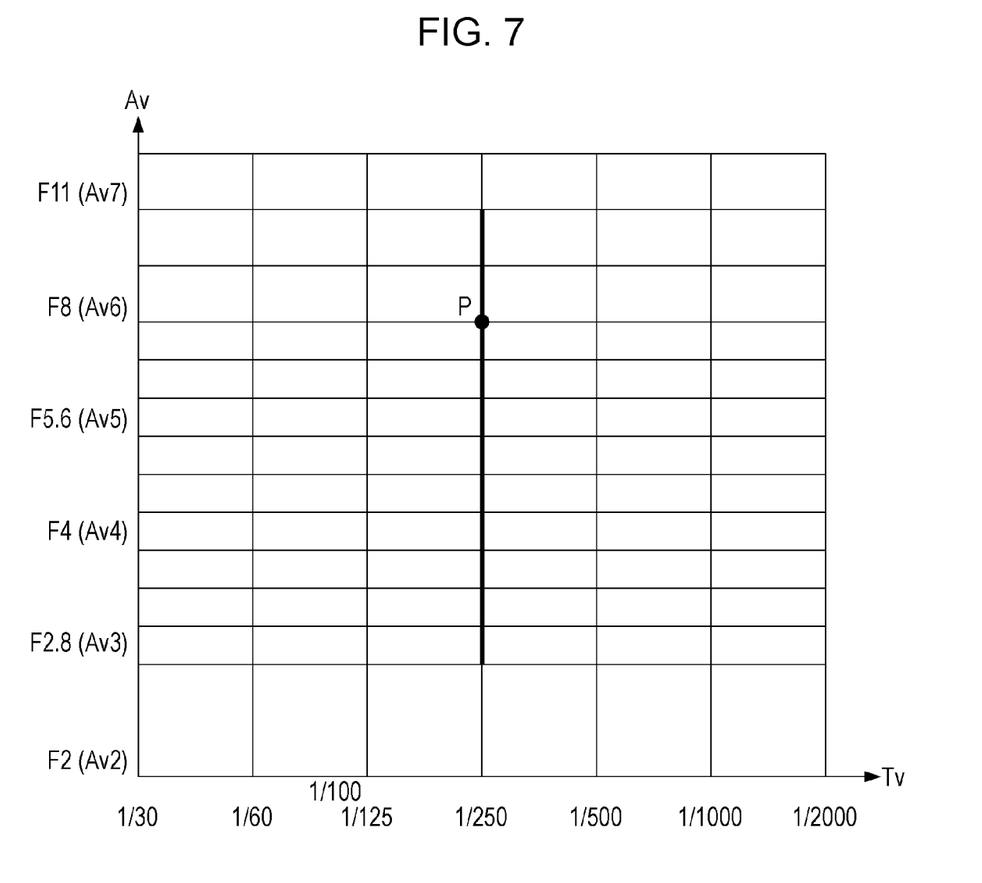
FIG. 7 is a program diagram extracting a relationship between Av and Tv from the program diagram of FIG. 6 according to the embodiment of the present invention.
Figure 9A:
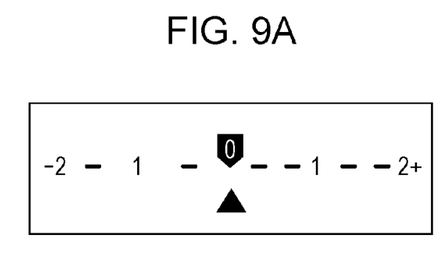
FIGS. 9A and 9B are illustrations showing user interfaces (UIs) that indicate the results of exposure correction according to the embodiment of the present invention.
Figure 9B:
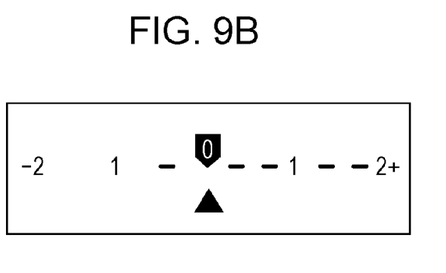

Herein, FIG. 7 is a program diagram extracting a relationship between Av and Tv from the program diagram of FIG. 6. FIGS. 9A and 9B are illustrations showing user interfaces (hereinafter, referred to as UIs) that indicate the results of the exposure correction. It is assumed that an exposure state which is determined as an optimum exposure as a result of the AE control is indicated by a point P illustrated in the program diagram of FIG. 7.

On the basis of the numerical data shown in FIG. 3 which is stored in the memory (not shown), since the step number corresponding to the aperture control in the range from F8 to F11 is a ½ step, the exposure correction from the point P may only select −½ step and −1 step. Thus, the control by a ⅓ step may not be selected.

Accordingly, the aperture control in the range from F8 to F11 employs the measure of a ½ step corresponding to the aperture control. In particular, the aperture control is displayed with the measure of a ½ step only at the minus side in the exposure correction UI as shown in FIG. 9A.

While the aperture control is described here, the shutter control may employ an operation similar to that of the aperture control.

Figure 8:
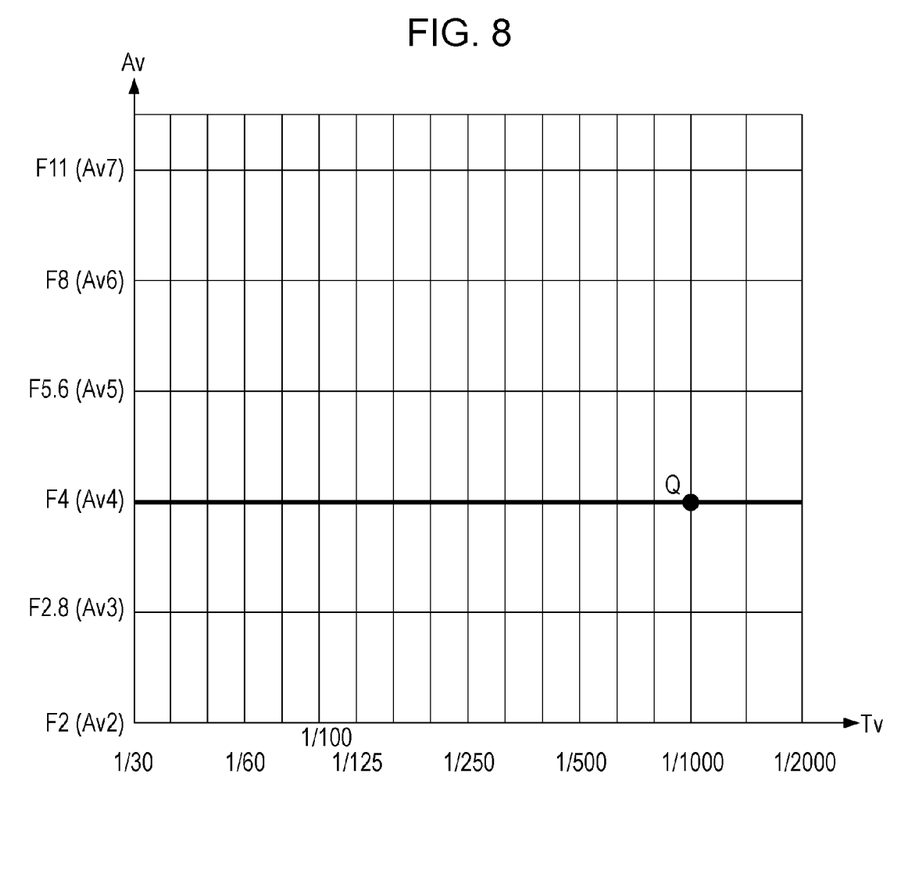
FIG. 8 is a program diagram showing a relationship between Av and Tv in the Av priority mode and in a case where Av is set to F4 according to the embodiment of the present invention.

For example, FIG. 8 is a program diagram showing a relationship between Av and Tv in the Av priority mode and in a case where Av is set to F4. The step number corresponding to the shutter speed control may be based on the numerical data shown in FIG. 4 which is stored in the memory (not shown).

It is assumed that an exposure state which is determined as an optimum exposure as a result of the AE control is indicated by a point Q illustrated in the program diagram of FIG. 8.

On the basis of the numerical data shown in FIG. 4 which is stored in the memory (not shown), since the resolution of the aperture control in a range from T being 1/1000 to T being 1/2000 is expressed as a ½ step, the exposure correction from the point Q may only select −½ step and −1 step. Thus, the control by a ⅓ step may not be selected.

Accordingly, the shutter control in the range from T being 1/1000 to T being 1/2000 employs the measure of a ½ step corresponding to the shutter control. In particular, the system controlling section 130 displays the shutter control by the measure of a ½ step only at the minus side in the exposure correction UI shown in FIG. 9A.

In addition, as shown in FIG. 9B, the system controlling section 130 may omit or diminish the displaying of a portion corresponding to the aperture at the minus side with respect to −1 step or a portion exceeding the shutter control range, so that the user may be visually recognize that the portion is outside the control range.

While the measure for the step numbers of the control employs a ⅓ step and a ½ step in this embodiment, a control measure smaller than these values may be employed by preparing and applying numeric data corresponding to the control measure.

As described above, in this embodiment, the exposure control with a high accuracy may be provided by changing the measure for the step numbers of the control for the exposure correction based on the image pickup parameters previously set by the image pickup apparatus.

While this embodiment uses the exposure modes such as the Av priority mode and the Tv priority mode which can be expressed with relatively simple program diagrams, it is not limited thereto.

Control similar to that described above may be provided as long as program diagrams are used, even in the case of complicated program diagrams such as a portrait mode with the aperture being set to the opening side and the field being set to be small, and a landscape mode with the aperture being set to the closing side and the field being set to be large.

Second Exemplary Embodiment

A second exemplary embodiment of the present invention is described with reference to the drawings. The function and configuration of the second embodiment are similar to those of the first embodiment, and descriptions thereof are omitted.

In this embodiment, the measure for the step numbers of the exposure correction may be changed in accordance with a luminance distribution of an object, and more particularly with a luminance range defined from a minimum luminance to a maximum luminance.

Figure 10:
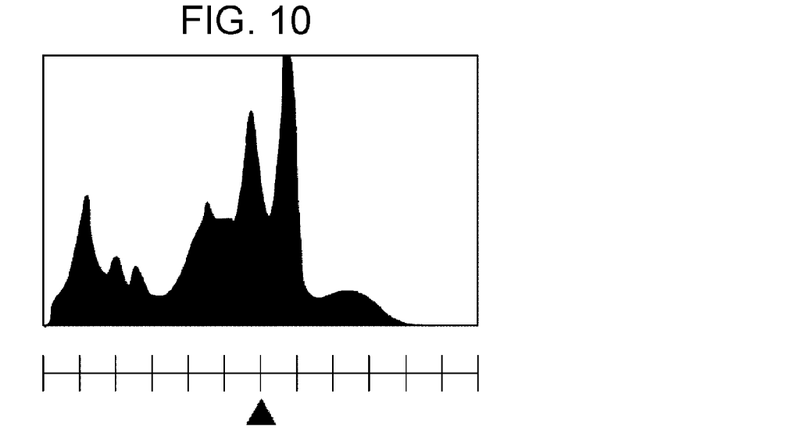
FIG. 10 is an illustration showing a histogram when a luminance distribution of a shot scene is within a dynamic range of an image pickup device according to a second embodiment of the present invention.
Figure 11:
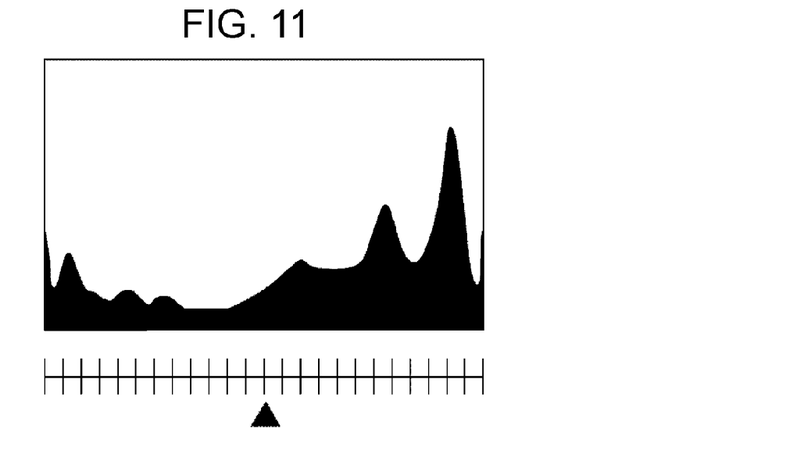
FIG. 11 is an illustration showing a histogram when a luminance distribution of a shot scene is not within a dynamic range of an image pickup device according to the embodiment of the present invention.

FIGS. 10 and 11 are illustrations showing UIs which are displayed. The UIs contain displaying of histograms that indicate luminance states of shot scenes with scales provided below the histograms so that the user can visually recognize the correction measure of the exposure correction. The UIs are operated by an instruction member (not shown) provided at the image pickup apparatus so as to correct the exposure.

FIG. 10 shows a histogram when a luminance distribution of a shot scene is within a dynamic range of the image pickup device. The luminance distribution of the image is within the dynamic range of the image pickup device as shown in FIG. 10, which means that an image does not contain overexposure with a high luminance or underexposure with a low luminance.

In particular, the image whose luminance distribution is within the dynamic range of the image pickup device would not cause the overexposure or the underexposure even when the exposure is corrected by a relatively large correction measure as shown in FIG. 10, as long as the exposure is corrected, or the luminance is adjusted, within the dynamic range.

Accordingly, if the exposure correction previously set during shooting is not optimum, the luminance of the image may be adjusted by a mechanism provided in a camera or by an external computer after the image is shot so as to obtain a desired image without deterioration in gradation of the image.

In contrast, FIG. 11 shows a histogram when a luminance distribution of a shot scene is not within a dynamic range of the image pickup device. The luminance distribution of the image is not within the dynamic range of the image pickup device as shown in FIG. 11, which means that an image contains the overexposure with a high luminance or the underexposure with a low luminance.

In the case where the overexposure or the underexposure occurs, even though the luminance of the image is adjusted by a mechanism provided in a camera or by an external computer after the image is shot, the gradation in the region with the overexposure or the underexposure may be deteriorated.

Accordingly, when the histogram exhibits the occurrence of the overexposure or the underexposure, the system controlling section 130 is required to correct a desired part of the image when the image is shot, by correcting the exposure by a small correction measure, for instance, as shown in FIG. 11.

At this time, to change the displaying of the correction measure of the exposure correction, a user may operate an instruction device (not shown) provided at the image pickup apparatus and select the correction measure through a setting window (not shown), or the image pickup apparatus may automatically determine the correction measure in accordance with the state of the luminance distribution.

Alternatively, the displaying of the correction measure of the exposure correction may be changed by the instruction device (not shown) provided at the image pickup apparatus.

While the correction measure is displayed in this embodiment, the correction measure may not be displayed. In such a case, the exposure may be corrected such that only the correction measure is automatically changed in accordance with the luminance range from the minimum luminance to the maximum luminance of an object, and the UI is operated using the instruction member (not shown) provided at the image pickup apparatus.

In addition, a markedly high luminance may be caused by a light source such as a powerful illumination or sunlight. In such a case, the luminance may not be determined whether it is within the dynamic range of the image pickup apparatus. Further, if the region of the maximum luminance or the region of the minimum luminance is negligibly small, the region may not be visible in the image. In such a case, the luminance may not be determined whether it is within the dynamic range of the image pickup apparatus.

As described above, with this embodiment, the exposure control with a high accuracy may be provided by changing the measure of the exposure correction in accordance with the luminance distribution of the image.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-325668 filed Dec. 1, 2006, which is hereby incorporated by reference herein in its entirety.

What is claimed is:

1. An image pickup apparatus comprising:
an image pickup unit configured to photo-electrically convert incident light;
a parameter setting unit configured to set a parameter to determine an exposure amount of the image pickup unit;
a correction measure determining unit configured to determine a correction measure of exposure correction, the correction measure being a minimum step of exposure correction, based on the parameter set by the parameter setting unit; and
an exposure correcting unit configured to perform the exposure correction by a correction amount which is an integer multiple of the correction measure determined by the correction measure determining unit.

2. The image pickup apparatus according to claim 1, wherein the parameter is a combination of at least an aperture value and a shutter speed.

3. The image pickup apparatus according to claim 1, further comprising a displaying unit configured to display a signal obtained from the image pickup unit,
wherein when the correction measure of the exposure correction is changed, the correction measure determining unit allows the changed correction measure to be reflected and displayed by the displaying unit.

4. The image pickup apparatus according to claim 1, wherein the correction measure is changed depending on whether a luminance distribution is within a dynamic range or not.

5. An image pickup apparatus comprising:
an image pickup unit configured to photo-electrically convert incident light;
a luminance obtaining unit configured to obtain luminance of a field;
a correction measure determining unit configured to determine a correction measure of exposure correction, the correction measure being a minimum step of exposure correction, in accordance with a luminance distribution of the field based on the luminance obtained by the luminance obtaining unit; and
an exposure correcting unit configured to perform the exposure correction by a correction amount which is an integer multiple of the correction measure determined by the correction measure determining unit.

6. A method of controlling an image pickup apparatus comprising:
photo-electrically converting incident light being focused on an imaging surface to pickup an image;
setting a parameter to determine an exposure amount used in the image pickup;
determining a correction measure of exposure correction, the correction measure being a minimum step of exposure correction, based on the set parameter; and
performing the exposure correction using a correction amount which is an integer multiple of the determined correction measure.

7. The method of controlling the image pickup apparatus according to claim 6, wherein the parameter is a combination of at least an aperture value and a shutter speed.

8. The method of controlling the image pickup apparatus according to claim 6, further comprising displaying a signal obtained in the image pickup,
wherein the determined correction measure is displayed.

9. The method of controlling the image pickup apparatus according to claim 6, wherein the correction measure is changed depending on whether a luminance distribution is within a dynamic range or not.

10. A method of controlling an image pickup apparatus comprising:
photo-electrically converting incident light being focused on an imaging surface to pickup an image;
determining a correction measure of exposure correction, the correction measure being a minimum step of exposure correction, in accordance with a range of the luminance distribution of the signal obtained in the image pickup; and
performing the exposure correction using a correction amount which is an integer multiple of the determined correction measure.

11. The image pickup apparatus according to claim 2, wherein the correction measure determining unit increases the correction measure in a case where the parameter setting unit sets a second aperture value which is larger than a first aperture value, as compared to a case where the parameter setting unit sets the first aperture value.

12. The image pickup apparatus according to claim 2, wherein the correction measure determining unit increases the correction measure in a case where the parameter setting unit sets a second shutter speed which is faster than a first shutter speed, compared to a case where the parameter setting unit sets the first shutter speed.

13. The image pickup apparatus according to claim 5, wherein the correction measure determining unit determines the correction measure in accordance with a range of the luminance distribution.

14. The image pickup apparatus according to claim 13, wherein the correction measure determining unit decreases the correction measure in a case where the range of the luminance distribution is wider than a predetermined range, as compared to a case where the range of the luminance distribution is not wider than the predetermined range.

15. The image pickup apparatus according to claim 14, wherein the predetermined range is a range of luminance distribution recognizable by the image pickup unit.

16. An image pickup apparatus comprising:
an image pickup unit configured to photo-electrically convert incident light;
a parameter setting unit configured to set a parameter to determine an exposure amount of the image pickup unit;
a correction measure determining unit configured to determine a correction measure of exposure correction based on the parameter set by the parameter setting unit; and
an exposure correcting unit configured to perform the exposure correction by the correction measure determined by the correction measure determining unit, wherein the correction measure determining unit increases the correction measure in a case where the parameter setting unit sets a second aperture value which is larger than a first aperture value, as compared to a case where the parameter setting unit sets the first aperture value.

17. An image pickup apparatus comprising:
an image pickup unit configured to photo-electrically convert incident light;
a parameter setting unit configured to set a parameter to determine an exposure amount of the image pickup unit;
a correction measure determining unit configured to determine a correction measure of exposure correction based on the parameter set by the parameter setting unit; and
an exposure correcting unit configured to perform the exposure correction by the correction measure determined by the correction measure determining unit,
wherein the correction measure determining unit increases the correction measure in a case where the parameter setting unit sets a second shutter speed which is faster than a first shutter speed, compared to a case where the parameter setting unit sets the first shutter speed.

18. A method to be performed in an image pickup apparatus comprising:
via an image pickup unit, photo-electrically converting incident light;
via a parameter setting unit, setting a parameter to determine an exposure amount of the image pickup unit;
via a correction measure determining unit, determining a correction measure of exposure correction based on the parameter set by the parameter setting unit; and
via an exposure correcting unit, performing exposure correction by the correction measure determined by the correction measure determining unit,
wherein the correction measure determining unit increases the correction measure in a case where the parameter setting unit sets a second aperture value which is larger than a first aperture value, as compared to a case where the parameter setting unit sets the first aperture value.

19. An image pickup apparatus comprising:
via an image pickup unit, photo-electrically converting incident light;
via a parameter setting unit, setting a parameter to determine an exposure amount of the image pickup unit;
via a correction measure determining unit, determining a correction measure of exposure correction based on the parameter set by the parameter setting unit; and
via an exposure correcting unit, performing the exposure correction by the correction measure determined by the correction measure determining unit,
wherein the correction measure determining unit increases the correction measure in a case where the parameter setting unit sets a second shutter speed which is faster than a first shutter speed, compared to a case where the parameter setting unit sets the first shutter speed.

* * * * *